Patented Sept. 28, 1954

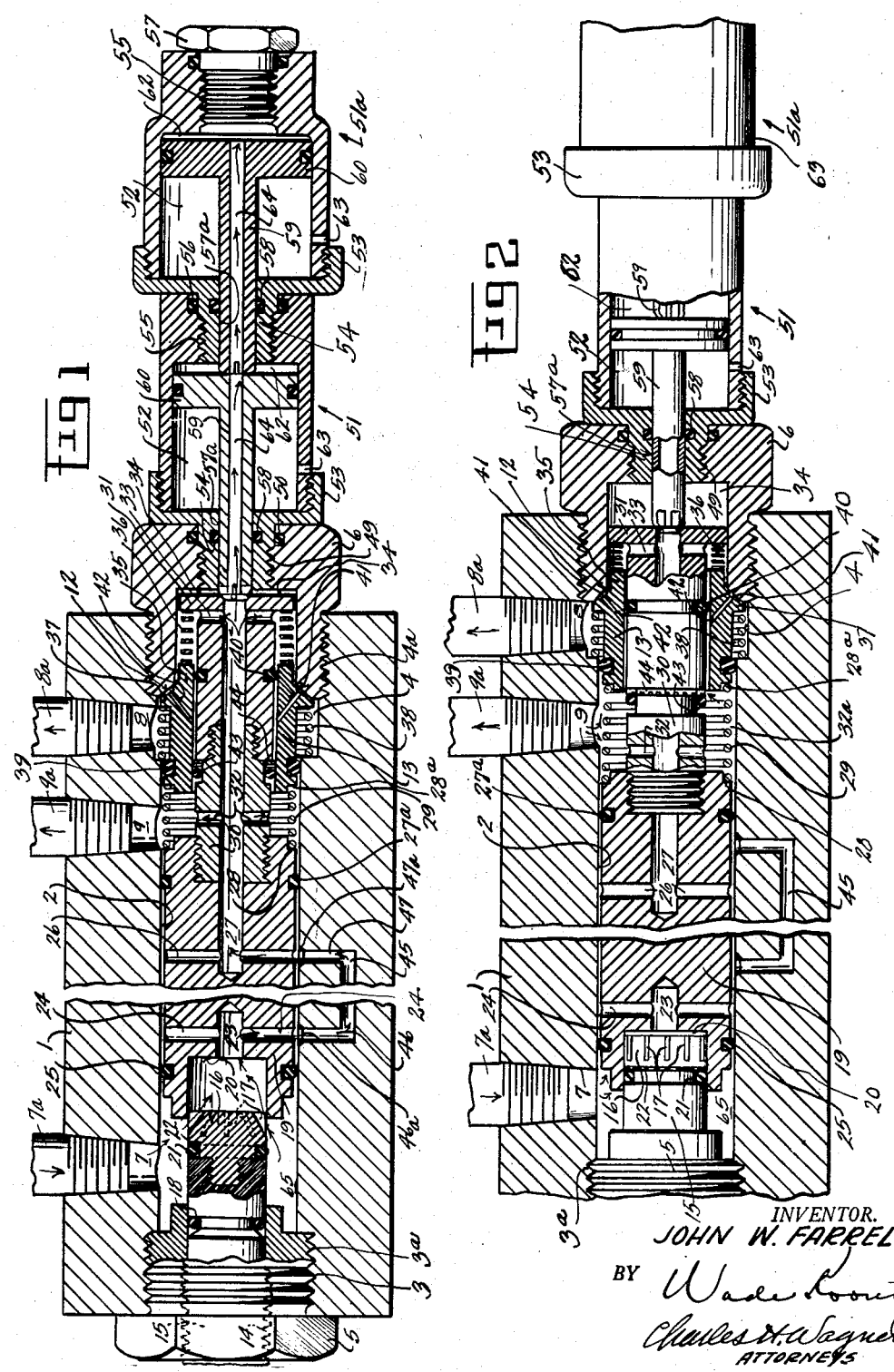

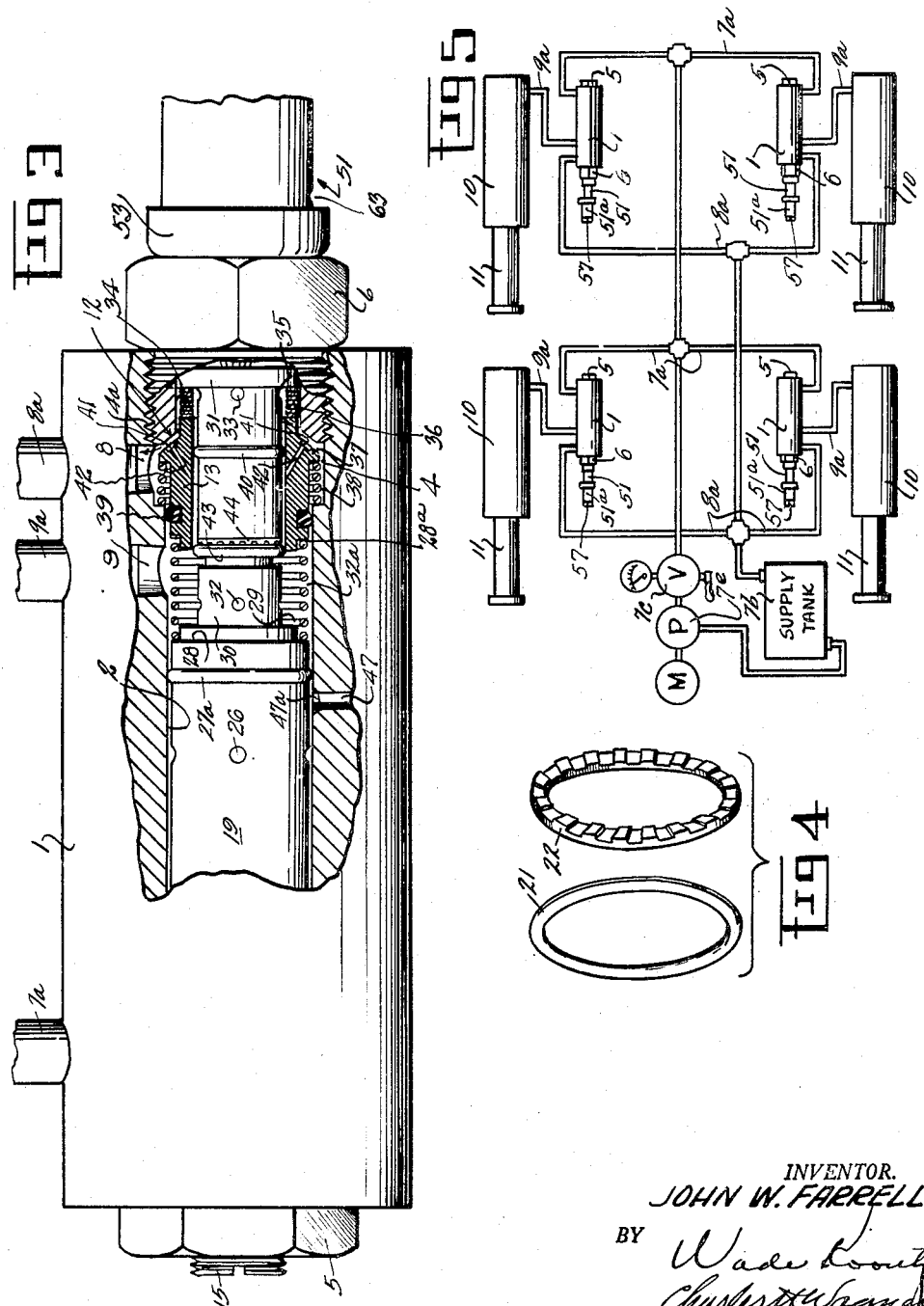

2,690,190

UNITED STATES PATENT OFFICE 2,690,190

DIFFERENTIAL PRESSURE CONTROL VALVE

John W. Farrell, Dallas, Tex.

Application May 7, 1953, Serial No. 353,699

19 Claims. (Cl. 137—102)

(Granted under Title 35, U. S. Code (1952), sec. 266)

The invention described herein may be manufactured and used by or for the Government for governmental purposes without payment to me of any royalty thereon.

This invention relates to differential pressure control valves, and more particularly to hydraulic valves which can be used in groups to control and manipulate different hydraulic pressures simultaneously and automatically on demand of a single master control valve.

In any hydraulic pressure requirement such as for the static testing of an airplane, predetermined relative loads are applied to different parts of structures by means of hydraulically operated load-struts or jacks and these tests often require about 10 to 20 different hydraulic pressures. It is necessary, with existing equipment, to provide an operator for each relative pressure to control and regulate each commonly connected group of struts or jacks. In order to apply a predetermined relative increment of the total ultimate load, each operator controls the application of the relative part of the load associated with his group of load struts by manual regulation, determined by the use of a valve and pressure gauge, and the actions of all of the operators should be simultaneous in both loading and unloading the struts. However, it often happens that the various operators are unable to attain the necessary coordination, and therefore adverse load distributions do result.

An object of my improved hydraulic valve is to improve the accuracy and control of such a pressure system by having all pressures automatically controlled by sensing devices which follow a single demand system.

Under the preview of my invention, each of my improved hydraulic control valves replace one of the operators that are now essential in performing the test. The entire system may be controlled by a single master valve that is employed to control the delivery of the same hydraulic pressure to the inlet or pressure fluid supply conduits for each of my improved valves and these valves in turn automatically regulate the pressure delivered from the pressure fluid delivery conduits of the valves to the load-struts or jacks, each strut therefor receiving its relative proportional pressure ratio.

This system of operating all of the improved hydraulic valves from one pressure is made possible by the principle of utilizing differential areas at the intake and outlet sides of the hydraulic valves, and the effective relative areas of the valve are adjustable to attain any desired ratio of control pressure to delivery pressure, these areas and ratios remaining constant during the test. The areas are variable for other tests by the substitution of certain predetermined sizes of differential pressure control selector-cylinder, removably or replaceably attached to the ends of the valves proper. Each valve or control device, when in use is adjusted to apply a specific ratio of control pressure in opposition to its inlet pressure. Since the pressure fluid will exert the same force on both sides of the valve when it is in closed position but the areas that the pressure fluid acts on at both sides are different and there will be a difference in pressure across the valve, and according to how the supply pressure is varied by means of the master controls, the valve piston will cause a feed or exhaust action, and all of the hydraulic valves will operate simultaneously to apply a true predetermined relative load distribution to the structure being tested.

A further object is the provision of a main differential hydraulic pressure control valve having predetermined differential pressure areas and an auxiliary actuator including a piston with an enclosing auxiliary cylinder in communication with the delivery pressure area above the piston with an actuator movable by the piston to assist in the closing of the main valve, whereby auxiliary cylinders or different diameters may be substituted to change the relative moving pressure of the actuator on the main valve.

A further object is the provision of a differential pressure control valve having predetermined operative pressure areas at opposite ends with one area in communication with a predetermined supply pressure and the other area in communication with the relative delivery pressure to control fluid delivery proportional to the ratio between the supply and delivery pressures, and an auxiliary pressure actuator device having a cylinder and piston with a predetermined pressure area in communication with the delivery pressure chamber, removably associated with the valve to supplement the operative delivery pressure area of said valve.

A further object is the provision of a differential pressure control valve having a cylinder formed with a pressure fluid supply chamber at one end and a pressure fluid delivery chamber at its other end, a piston valve reciprocatable within the cylinder having differential pressure areas at its opposite ends and pressure operated piston valve means for controlling the pressure delivery to the delivery pressure chamber including a pressure fluid supply conduit in communication with the delivery pressure chamber and a valve seat between the fluid delivery conduit and the delivery pressure chamber, together with a sleeve valve surrounding the piston valve seatable on said seat and having a predetermined operative differential pressure areas in communication at both sides in communication with said delivery pressure, said cylinder having an exhaust conduit intermediate the piston sleeve valve differential pressure areas, adapted to vent the delivery pressure chamber upon unseating of the valve, and an auxiliary differential pressure actuator means removably connected to the cylinder for moving the piston valve toward closed position comprising an auxiliary pressure cylinder removably connected to the casing having a piston therein formed with a predetermined pressure area and means for actuating the piston toward the pressure supply chamber to close the pressure supply, and means for introducing pressure fluid from the fluid pressure delivery chamber into the auxiliary cylinder above the piston, to cause actuation of the piston valve in addition to the pressure on the piston valve in the said delivery pressure chamber.

A further object of the invention includes means for admitting the delivery pressure fluid directly to the piston sleeve valve seat incident to movement of the piston valve toward the pressure fluid supply chamber, for admitting the pressure fluid from the delivery pressure chamber directly to the seat to accelerate the unseating of the piston sleeve valve and accelerate the reduction of pressure in the supply conduit.

A further object is the use of O rings carried by the piston valve between the piston sleeve valve and said piston valve and between said piston valve and the casing, adapted to be uncovered by relative movement of the piston valve, and serrated back up rings or washers means located behind the O ring means for admitting pressure fluid under the said O ring incident to the uncovering of the same by relative movement between the piston valve and piston sleeve valve to relieve pressure trapped under the O ring tending to displace the O rings from their receiving recesses.

Other objects and advantages of my invention will become more apparent from the following description and the accompanying drawings in which like reference characters refer to like parts in the several figures.

*Drawings*

Fig. 1 is a central longitudinal sectional view taken through the center one of my improved differential pressure control valves incorporating my invention, illustrating the same in initial or pressure fluid delivery position, showing the incorporation of two of the interchangeable control devices for varying the effective ratio of the differential pressure control areas, intermediate parts being broken away and the valve foreshortened for convenience.

Fig. 2 is a fragmentary sectional view, somewhat similar to Fig. 1, but illustrating the piston valve shifted to pressure fluid supply "cut off" or static position, such as when the piston valve is in equilibrium, part of the removable or changeable differential pressure area control cylinders being shown in elevation.

Fig. 3 is a fragmentary elevation view of the differential pressure control device shown in section in Figs. 1 and 2, the right hand portion being broken away and shown in section. The piston valve and piston sleeve valve members being shown in their "exhaust" position for relieving the delivery pressure to the load applying jacks when this pressure exceeds the predetermined ratio of the delivery pressure to the supply pressure, either because of overload or reduction of the supply pressure.

Fig. 4 is a detail perspective view of one of the rubber O rings and its associated back up ring which is employed between the reduced extension of the piston valve on which the piston sleeve valve is mounted and the interior of the piston sleeve valve, and also employed between the pressure fluid supply cut off plug valve its accommodating valve socket in the piston valve, for relieving the pressure back of the O rings prior to and after their complete uncoverage.

Fig. 5 is a somewhat schematic diagram illustrating a simple test unit employing a plurality of pressure applying struts or jacks, each strut having one of my improved automatic differential pressure control valves operatively connected thereto, together with a master control valve for supplying any predetermined initial "supply" pressure to the differential pressure control devices.

Referring more particularly to Fig. 1, my improved adjustable differential pressure control valve comprises a main elongated casing or block 1 having any desired exterior shape, such as cylindrical or rectangular. The casing 1 is bored longitudinally to provide a main cylinder 2 which is concentrically enlarged at 3 and 4 at its opposite end, and threaded at 3a and 4a for receiving the end closure means or plugs 5 and 6.

A pressure fluid supply conduit 7 is formed in casing 1 in communication with the main cylinder 2 at its pressure fluid supply or inlet end adjacent the end closure plug 5, the conduit 7 being threaded to receive a pressure fluid supply conduit 7a adapted to be connected to a suitable pressure source such as 7b, with a master control pressure regulating valve such as indicated at 7c (as seen in Fig. 5) interposed therebetween. The counter-bored or enlarged portion 4 at the other end of the cylinder is connected with a pressure fluid exhaust conduit 8 formed in the block 1 and threaded to receive an exhaust or pressure fluid return conduit 8a for conveying the exhaust pressure fluid back to the fluid supply reservoir 7b associated with the pump 7e and forming the initial fluid pressure supply or source.

The casing or block 1 is formed with a pressure fluid delivery conduit 9 located adjacent the exhaust conduit 8 and intermediate the exhaust conduit 8 and the pressure fluid supply conduit 7, the exhaust or return conduit 9 being threaded to receive a pressure fluid delivery conduit or pipe 9a adapted to be connected at its other end to one (or more) of the load struts or hydraulic jacks 10.

The jacks 10 are "conventional" and comprise a main cylinder of some predetermined size relative to the predetermined delivery pressure ratio, each having a piston jack member 11 therein adapted for suitable connection to a cross member (not shown) having suitable spaced connections to the part of the aircraft which is to be stressed by the applied testing pressures, by extension of the jack member or members 10 under the applied differential pressures. The inner end of the end closure plug member 6 is beveled substantially as shown in Figs. 1 to 3 to provide a valve seat 12 for a piston sleeve valve indicated generally at 13.

The plug closure 5 is provided with a threaded axial bore 14 which adjustably receives a plug valve supporting standard 15 extending into the cylinder 2 having a threaded socket into which is mounted a pressure fluid inlet plug valve head 16 having radial fluid inlet slots 17 with their bottoms inclining outwardly and rearwardly from the outer end of the valve. An O ring seal 18 is interposed between the standard 15 and the bore 14 to prevent leakage.

A piston valve 19 is reciprocatably mounted within the cylinder 2, preferably having a loose sliding fit, this piston valve having a plug valve seat or socket 20 for reception of the plug valve head 16, an annular channel being formed on the plug valve head having an O ring seal 21 and serrated back up washer 22 therein for sealing engagement of the ring 21 with the wall of the piston valve recess 20 upon maximum closing movement of the piston valve toward the end closure 5 (as seen in Fig. 2), the serrated back up washer 22 (shown in Fig. 5) permitting pressure to escape from under the O ring upon displacement of the O ring 21 from the end of the wall of the valve socket 20 as shown in Fig. 1.

The piston valve 19 is formed with a fluid conduit 23 extending axially inward from the base of the plug valve recess 20, with laterally or radially extending fluid conduits 24 extending therefrom to the outer surface of the piston valve, substantially as shown. An O ring fluid pressure seal 25 is provided on the piston valve 19 intermediate the lateral passages 24 and the valve socketed or pressude fluid supply end thereof, in a suitably provided annular groove in its outer wall.

The piston valve 19 is formed with a second set of radial pressure fluid delivery passages 26 extending inwardly from the outer surface thereof, with their inner ends in communication with a central passage 27 extending therefrom through the piston valve to the opposite end thereof. A second O ring seal 27a is provided on the piston valve 19, spaced from the outlet ends of the passages 26 toward the said opposite end of the piston valve, sealing the space between the two sets of radial passages 24 and 26 and the pressure fluid delivery conduit 9, the other O ring seal 25 seals the space just referred to from the pressure fluid supply conduit 7.

Just beyond the O ring seal 27a the piston valve is stepped down in diameter to provide a spring seat 28 for one end of a coil spring 29 surrounding a reduced stem portion or axial extension 30 terminating in an end flange or head 31, the other end of the spring 29 engaging a spring seat 28a on the inner end of the piston sleeve valve 13. A third set of radial passages 32 connects the central bore 27 with the space between the adjacent ends of the piston sleeve valve 13 and piston valve body 19 for fluid communication between the bore 27 and the pressure fluid delivery conduit 9 at all times. Just under the flanged head portion 31 of the stem are formed a fourth set of radial passages 33 establishing fluid communication at all times between the bore 27 and a delivery fluid pressure chamber 34 formed in the end closure 6 above the sleeve valve seat 12.

The piston sleeve valve 13 is reciprocatably slidable on the stem 30 and has a short annular extension 35 projecting into the pressure chamber 34 in spaced relation thereto for seating engagement with a second coil spring 36 the opposite end of the spring being disposed for seating engagement under the flanged end of head 31. The piston sleeve valve 13 has a valve head portion 37 disposed for fluid sealing engagement with the valve seat 12 on the end closure 6 and is movable in the counter bored space 4 by movement of the piston sleeve valve 13 to establish fluid communication between the delivery pressure chamber 34 and the exhaust conduit 8. A coil spring 38 is preferably provided and interposed between the under side of the valve head portion 37 and the inner end of the counter bore for urging the piston sleeve valve 13 toward its valve seat 12, in opposition to the pressure in the chamber 34 effective on the end area of the piston sleeve valve 13. An O ring 39 surrounds the exterior of the piston sleeve valve 13, in sealing relation with the cylindrical bore 2 at all times and located between the pressure fluid delivery conduit 9 and the exhaust conduit 8. A second O ring seal 40 surrounds the stem 30 in sealing relation with the inner surface or bore of the piston sleeve valve 13 preventing fluid pressure leakage intermediate interior of the piston sleeve and its supporting stem 30 at all times.

In order to accelerate the release, and disengagement, of the piston sleeve valve head 37 from its seat 12 upon a raise in pressure in the pressure fluid delivery conduit 9 (and in the pressure chamber 34), in excess of the relative predetermined pressure, the valve face of the piston sleeve valve is formed with an annular groove 41 intermediate its edges in communication with rearwardly and inwardly inclined passages 42 leading therefrom to the space between the interior of the sleeve valve 13 and the outer surface of the piston valve stem 30 intermediate the opposite ends of the piston sleeve valve and rearwardly of the O ring seal ring 40 therefor.

While the stem 30 is actually made up of a plurality of interconnected sections, for convenience this part of assembly has been referred to herein as a single concentric reduced cylindrical portion or stem extending from the enlarged portion and terminating in the head 31 with the conduit 27 extending centrally through the stem to the surrounding delivery pressure chamber 34 and, of course, with the piston sleeve valve 13 slidably mounted on the stem 30.

In order to establish, or interrupt, fluid pressure communication between the small inclined conduits 42 and the pressure fluid delivery conduit 9, intermediate the end of the main body of the piston valve 19 and the inner end of the piston sleeve valve 13 the stem 30 is provided with a second annular channel having an O ring 43 therein, backed up by a serrated washer similar to the washer 44. The location of this O ring 43 on the stem 30 is important and is disposed to enter the rear end of the bore of the piston sleeve member upon movement of the piston member 19 to the fluid delivery position, shown in Fig. 1, and is moved to a position immediately adjacent to the rear end of the sleeve valve when the piston valve 19 and sleeve valve 13 are in the static or balanced position shown in Fig. 2, the O ring 43 being moved to a disengaged position by the piston valve when the piston valve is moved to its pressure relief or exhaust position, shown in Fig. 3. In passing from the former position to the latter position, the O ring 43 is uncovered and the serrated back up washer 44, like the washer 22, permits a pressure equalization under the O ring, pressure fluid being allowed to enter through passages 42 to the annular groove 41 in the sleeve valve face to cause a more rapid disengagement of the piston sleeve valve head 37 from its seat 12.

In order to establish pressure fluid communication between the short central conduit 23 and the longer axial conduit 27, through the respective radial conduits 24 and 26, the wall of the casing 1 is formed with a conduit or conduits 45 extending parallel to the axis of the main cylinder 2 with laterally extending conduits 46 and 47 at its opposite ends in communication with the interior of the main cylinder 2. The ends of the conduits 46 and 47 in communication with the cylindrical bore 2 are beveled at 46a and 47a and located to register substantially in alignment with the radial passages 24 and 26 respectively when the piston valve 19 is in its pressure fluid delivery position (as shown in Fig. 1). The respective pressure fluid inlet and outlet beveled ends 46a and 47a are always in communication with the space between the interior of the cylinder or bore 2 and the exterior of the piston valve 19, intermediate the spaced O ring seals 25 and 27 at all times.

The end closure plug 6 is formed with a central, threaded opening 49 having an O ring seal 50 therein for removably mounting the supplemental or auxiliary differential pressure cylinders or actuator devices 51 for respective actuating engagement of their piston rods with the head 31 of the piston valve member 19 and the piston or pistons 60.

As mentioned in the opening statement these auxiliary differential pressure control devices (51) are of predetermined different sizes, and the proper size or capacity may be substituted, depending upon the desired predetermined differential pressure ratio desired between the pressure fluid inlet pressure (from conduit 7a) and the pressure fluid delivery pressure to the jacks 10 from the delivery conduits 9a.

As best seen in Figs. 1 and 2 my improved valve control devices 51 each comprise a short cylinder 52, closed at its lower end by a cap 53 having a central threaded shank or stem 54 which is receivable in the threaded opening 49 in sealing relation with the O ring 50, the top of the cylinder 52 being formed with a threaded central opening 55 and O ring 56 of similar dimension to the threaded opening 49 and O ring 50 just mentioned.

When the differential pressure ratio requirement between service and delivery pressures calls for only one of the auxiliary pressure control devices 51 a conventional plug (such as the plug 57) is screwed into the opening 55, sealing the top end of the required cylinder 51. As shown in Figs. 1 and 2, however, a second pressure device 51a is employed, screwed in the opening 55 instead of the plug and the upper end of its cylinder closed by the plug 57. Since these auxiliary pressure devices are all substantially identical except for the operative pressure area of their operating pistons similar reference numerals will be used in the drawings. The threaded extensions or stems 54 are each formed with an axial guide opening 57a and sealing gaskets or O ring 58 for slidably receiving a tubular or hollow piston rod actuator 59 adapted to extend into the delivery pressure chamber 34 for impinging or actuating engagement with the head 31 of the piston valve 19. Where two auxiliary cylinders are employed the outer cylinder piston rod engages the piston of the inner auxiliary cylinder 51. Pistons 60 are fixed on the other ends of the piston rods 59, closing the cylinders 52 to form the auxiliary differential pressure chambers 62 above the pistons 60. Each cylinder 52 is vented below the piston 60, as at 63, either in the side wall or base of the cap 53. A central passage 64 extends through the piston rods 59 and pistons 60 to establish fluid pressure communication between the central passage 27 of the piston valve 19 and the auxiliary pressure chambers 62 in the cylinders 52. The contact or actuating ends of the hollow piston rods 59 may be serrated to allow the pressure fluids passing therein to escape laterally, for instance between their impinging ends and the contacted piston heads 31 and 60, into the respective differential pressure chambers 34 and 62.

In the initial operation of my improved differential pressure control device the proper size auxiliary cylinders 52 are selected for the desired differential delivery pressure area at the fluid delivery sides of the piston member or members 60 and 19 relative supply pressure area at the opposite side of the piston member 19 and then screwed in place as shown in Fig. 1. The relative diameter or diameters of the cylinder or cylinders 52 as compared to the effective diameter or pressure area of the main cylinder 2 and piston valve 19 as shown in the drawings is not necessarily accurately proportioned, since the drawings are primarily for illustrative purposes and the effective proportional diameters may be easily calculated by any one skilled in the art. Actually the pressure area of the pistons 60 and cylinders 52 would probably be considerably smaller, relative to the diameter of the main cylinder 2, than shown.

Referring to Fig. 1, when a predetermined pressure is admitted into the supply or service pressure chamber 65, the pressure is, of course, immediately operative on the whole area of the left hand end of piston valve 19, although the pressure fluid medium passes through conduits 23, 24, 46, 45, 47, 26, 27 and 32, out between the coils of spring 29 and into the delivery conduits 9 and 9a to the respective jack or jacks 10 causing the jacks to be extended by exerting a pressure thereon proportional to the pressure in the delivery conduit and the predetermined area of the jack pistons.

The pressure fluid also passes through the conduit 27 out of the end of piston valve 19 and lateral conduits 33 into the delivery pressure chamber 34, also through the conduit (or conduits) 64 into the auxiliary delivery pressure chamber (or chambers) 62 above the respective piston (or pistons) 60 to oppose the movement of the piston valve to the right by service pressure in chamber pressure supply chamber 65. When the predetermined delivery pressure ratio is reached in delivery pressure chamber 34, space 32a between the right hand end piston valve 19 and piston sleeve valve 13, and in the auxiliary delivery pressure chamber (or chambers) 62 as determined by the total operative areas thereof relative to the opposing operative area of the piston valve which is exposed to the supply pressure (and coil spring 29) the piston valve 19 is caused to move to the left toward the closing position as in Fig. 2. The rate of flow of the pressure fluid through the valve to the delivery conduit 9a is reduced as the plug valve recess 20 in the piston valve 19 telescopes over the plug valve 16 since the pressure fluid now entering through the slots 17 which are diminishing in operative area cutting down the rate of flow. Finally when the static position is reached, as shown in Fig. 2 the serrated washer 22 and its O ring 21 enters the cylindrical valve socket 20 interrupting any further pressure fluid delivery to the delivery conduits 9a and jacks 10.

If master valve 7c is manipulated to increase the initial supply pressure the piston valve will be shifted to the right as apparent, then returned to the static position again upon the increased delivery pressure again reaching the relative predetermined value again. Any increase in the predetermined relative delivery pressure relative to supply pressure immediately opens the piston sleeve valve 13 automatically to reduce the excess pressure again down to the predetermined ratio of the existing supply pressure.

Should an "overload" occur caused, for instance, by an excess delivery pressure being created in one of the connected jack cylinders 10, due to a partial failure at some other point in the tested structure overloading the jack the overload will cause a relative increase in the delivery pressure in the connected control cylinder 1, producing relatively excessive pressure in the chambers 32a, 34, and chamber or chambers 62 depending upon how many of the auxiliary differential pressure cylinders 51, 51a etc. are required to determine the exact pressure differential ratio between the supply and delivery pressures. The piston 19 will be moved to the left toward the position shown in Fig. 3, this movement compressing the spring 36 against piston sleeve valve 13. The piston sleeve valve 13 is normally held seated by reason of smaller operative circumferential area at inside of valve seat 12 and larger operative circumferential area at its opposite end exposed to the delivery pressure.

When the piston valve 19 moves to left it shifts the O ring 43 and serrated washer 44 out of the left hand end of the piston sleeve valve 13 and delivery pressure is permitted to pass longitudinally between the stem 30 of the piston valve and the interior of the piston sleeve valve 13, the pressure being delivered through the inclined conduits 42 to the annular groove 47 in the piston valve head thus increasing the operative delivery pressure area at the right hand end over the valve seat 12 in excess to the opposing pressure at its other end, thus this pressure and the compressed coil spring 36 quickly move the piston sleeve valve 13 to the left to uncover the exhaust conduit 8 to the delivery pressure and the delivery pressure is allowed to escape until it is reduced to the former predetermined pressure differential relative to the inlet pressure from conduit 7.

If the master pressure regulating valve 7c is readjusted to a lower supply pressure the valves 19 and 13 are also moved in a similar manner, proportionally reducing the delivery pressure. When the supply pressure is increased the piston valve moves to right, uncovering the passages 17 in plug valve head 16 until the pressure ratio is again established, returning the valves again to above static positions shown in Fig. 2. The serrated back up washer 44 is desirable to allow the pressure to escape from under the O ring 43 and prevent the O ring from being blown out of its retaining groove in the stem 30 when it is shifted to the uncovered position by the piston valve 19.

It is thought that the sizes of the replaceable selector cylinders 52 can be limited to about three different sizes or operative areas and they are indicated by code numbers for the various pressures and tabulated for the ratios of output to feed pressure. When the operator requires a valve to yield a certain predetermined pressure which is a certain percentage of the inlet or feed pressure, he simply locates the percentage on a tabulated table, identifies the code number of the auxiliary cylinder or combination of cylinders corresponding to the pressure, and the cylinders when screwed in position after the manner shown, without the use of tools, will then give the desired selected differential pressure automatically and no calibration or adjustment is required.

In the disclosed construction of the valve device the pressure of the fluid acting on the effective area of the selector-cylinder (or cylinders) will produce the force that is transmitted by the piston rods 59 to the head 31 of the piston valve 19.

It is to be clearly understood that the description in the specification and drawings is by way of illustration only and not to be taken in any way as limiting the spirit and scope of the invention, as it is intended to be limited only by the terms of the appended claims.

I claim:

1. In a fluid differential pressure regulator, a main casing having a cylindrical bore therethrough, a cylindrical piston valve reciprocatably mounted within said bore, and formed with a concentric valve receiving recess in one end facing one end of the bore, a first end closure for that end of the bore having a concentric cylindrical valve extension projecting therefrom into the bore adapted to seat in said cylindrical recess upon movement of the piston valve toward the extension, a pressure fluid supply conduit in communication with the interior of the bore between the said recessed end of the said piston valve and said end closure member, said piston valve having a concentric reduced extension projecting from its other end toward the opposite end of said bore and formed with a head at its end, a piston sleeve valve reciprocatably mounted on said reduced extension between said head and the adjacent end of the piston valve, a second end closure member for closing the other end of the bore having a valve seat for fluid sealing engagement with said piston sleeve valve upon movement of the piston valve toward the second end closure, said casing having a pressure fluid delivery conduit in communication with the bore intermediate said piston sleeve valve and said piston valve and formed with a pressure fluid exhaust conduit in communication with said bore intermediate said sleeve valve seat and said second closure, to establish communication between the delivery and exhaust conduits by movement of the sleeve valve off of its valve seat, conduit means establishing fluid communication at all times through said piston valve between the said cylindrical valve recess, said pressure fluid delivery conduit, and the interior of the bore between said head and the adjacent end of piston sleeve valve, fluid sealing means between the piston sleeve valve and the bore intermediate said fluid delivery and exhaust conduits, fluid sealing means between said piston valve and said bore intermediate said pressure fluid supply conduit and said pressure fluid delivery conduit, fluid sealing means between said piston valve extension and the interior of the piston sleeve valve, auxiliary piston valve actuating means removably connected to the second end closure means comprising a fluid pressure cylinder, a piston reciprocatable therein, actuating means operable between the said piston and said piston valve for moving the piston valve within the bore toward said first closure to seat the cylindrical valve extension in the said piston valve recess, and means establishing pressure fluid communication at all times between said pressure fluid delivery conduit and one side of said piston for moving said piston toward said first closure, and venting means formed in said pressure cylinder intermediate the piston and said second closure for relieving the opposing pressure on said piston.

2. Apparatus as claimed in claim 1, in which said piston sleeve valve is of the poppet type and formed with an annular channel in its valve surface having passages leading from the inner surface of said piston sleeve valve to the said annular channel, and the sealing means between the adjacent inner surface of the piston sleeve valve and the outer surface of the piston valve extension to interrupt the fluid sealing relation of the sealing means incident to relative movement of said piston valve extension toward said first closure to establish fluid communication between said passages in the piston sleeve valve and the said fluid delivery conduit.

3. Apparatus as claimed in claim 1 in which said auxiliary piston valve actuating means comprises a tubular piston rod connected to the said piston with its opposite end projecting toward said piston valve for actuating impingement with the stop shoulder end of the piston valve, and the fluid pressure communication means includes a pressure fluid conduit through the piston and said tubular piston rod in communication at one end with said conduit means adjacent the head end of the piston valve, and at its other end with the auxiliary fluid pressure cylinder above the piston therein.

4. In an automatic pressure fluid pressure regulating valve structure, a casing formed with a pressure cylinder therein having a pressure fluid supply conduit adjacent one end adapted to be connected to a source of predetermined pressure, a pressure fluid exhaust conduit connected to said cylinder at its opposite end, a pressure fluid delivery conduit connected to said cylinder intermediate said fluid delivery and exhaust conduits, a piston valve reciprocatable within said cylinder with one end thereof adapted for fluid communication with said pressure fluid supply conduit, and its other end in communication with said pressure fluid delivery conduit, pressure fluid delivery conduit means formed in said piston valve establishing pressure fluid communication between said pressure fluid supply and delivery conduits and the ends of the piston valve, pressure fluid delivery control valve means intermediate said pressure fluid supply conduit and said piston valve pressure fluid conduit means for controlling the delivery of fluid from said pressure fluid supply conduit to said piston valve conduit means incident to variable movement of the piston valve toward the pressure fluid supply conduit, piston sleeve valve means slidably carried on said piston valve intermediate the pressure fluid delivery conduit and said pressure fluid exhaust conduit for controlling the exhaust of the pressure fluid from said piston valve pressure fluid conduit means, a pressure fluid pressure chamber in said cylinder located between the end thereof and the end of the piston valve, in pressure fluid communication with said piston valve pressure fluid conduit means, spring means between the cylinder and the piston sleeve valve means for urging the piston sleeve valve means toward its seat to control pressure fluid communication through said piston valve conduit means between said pressure chamber and the pressure fluid exhaust conduit, an auxiliary differential pressure control cylinder detachably connected to said casing in communication with said fluid pressure chamber, a piston operable within said auxiliary cylinder, a piston rod connected to said piston and disposed for actuating engagement with said piston valve, said piston and rod having a pressure fluid delivery passage therethrough for establishing pressure fluid communication between said auxiliary pressure cylinder above said piston and said piston valve fluid pressure chamber, resiliently yieldable means on said piston valve between the same and the piston sleeve valve and movable by the piston valve to unseat said piston sleeve valve to establish pressure fluid communication between said pressure chamber and said pressure fluid exhaust conduit upon predetermined movement of said auxiliary cylinder piston toward said casing, spring means between said piston valve and said piston sleeve valve for yieldably urging the piston sleeve valve toward said pressure chamber tending to unseat said piston sleeve valve incident to movement of the piston valve toward said pressure chamber, and pressure fluid sealing ring means interposed between the inner surface of the piston sleeve valve and the exterior surface of the said piston valve to prevent pressure fluid leakage between said piston sleeve valve and said piston valves upon predetermined relative movement of the piston valve toward said pressure chamber, said ring means being movable to an inoperative non-sealing position by relative movement of the piston valve to the sleeve valve in a direction away from the pressure chamber to establish fluid communication between the opposite ends of the piston sleeve valve, intermediate the adjacent outer and inner surfaces respectfully of said piston valve and the piston sleeve valve.

5. In an automatic fluid pressure regulating valve structure, a casing formed with a pressure cylinder therein having a pressure fluid supply conduit adapted to be connected at one end to a source of predetermined service pressure, said cylinder being connected at its opposite end to a pressure fluid exhaust conduit, and connected intermediate said pressure fluid supply and exhaust conduits to a pressure fluid delivery conduit, a piston valve reciprocatable in said cylinder having one end thereof in fluid communication with said fluid pressure supply conduit and its other end in communication with said fluid delivery conduit, pressure fluid delivery conduit means formed in said piston valve establishing fluid communication between said pressure fluid supply and delivery conduits and the opposite ends of the piston valve, cooperating pressure fluid delivery control valve means carried by the pressure cylinder and piston valve intermediate said pressure fluid supply to the cylinder and said piston valve conduit means for variable controlling the delivery of the pressure fluid to said piston valve conduit means incident to movement of the piston valve toward the pressure fluid supply conduit, piston sleeve valve means carried by said piston valve means intermediate the pressure fluid delivery conduit and said pressure fluid exhaust conduit for controlling the exhaust of the pressure fluid from said piston valve pressure fluid conduit means, a pressure fluid chamber formed in said cylinder between the ends thereof and the end of the piston valve, in communication with said piston valve pressure fluid conduit means, spring means between the cylinder and the piston sleeve valve means for urging the said piston sleeve valve means toward its seat to control pressure fluid communication between the pressure fluid chamber and the pressure fluid exhaust conduit, a differential pressure fluid control cylinder detachably connected to the casing in communication with said fluid pressure chamber, a piston operable within said control cylinder, a tubular piston rod connected to said piston for actuating engagement thereof with the end of said piston valve, said piston and rod having a fluid passage therethrough establishing pressure fluid communication between the control cylinder above said piston and said pressure fluid pressure chamber, resiliently yieldable means on said piston valve between the piston valve and said piston sleeve valve movable by the piston valve to unseat said piston sleeve valve to establish pressure fluid communication between said pressure fluid chamber and said pressure fluid exhaust conduit upon movement of said control cylinder piston in a direction toward said piston valve, spring means between said piston valve and the piston sleeve valve for yieldably urging the piston sleeve valve in the opposite direction incident to movement of the piston valve toward said pressure chamber, pressure fluid seal ring means interposed between the interior of the piston sleeve valve and the exterior of the piston valve for arresting fluid leakage between the interior and exterior surfaces of the said piston sleeve and piston valves upon movement of said piston valve toward said pressure chamber, said pressure fluid seal ring means being movable to an inoperative position by said piston valve by relative movement of the piston valve to the piston sleeve valve away from the pressure chamber, to establish restricted fluid communication intermediate the opposite ends of the piston sleeve valve between the piston valve and the piston sleeve, said piston sleeve valve having a plurality of small fluid conduits connected at one end between the space between the piston valve and piston sleeve valve and connected at the opposite ends in communication with the valve seat engaging portion of the piston sleeve valve.

6. An automatic fluid pressure regulating valve structure comprising a casing having a pressure cylinder therein having a pressure fluid supply conduit therefor adapted to be connected at one end to a source of predetermined pressure, a pressure fluid exhaust conduit connected to said cylinder at its opposite end, and a pressure fluid delivery conduit connected to said cylinder intermediate said pressure fluid supply and exhaust conduits, a piston valve reciprocatable in said cylinder, said cylinder having one end thereof in fluid communication with said pressure fluid supply conduit with its other end in communication with said pressure fluid delivery conduit, pressure fluid delivery conduit means formed in said piston valve for establishing fluid communication through the piston valve between said pressure fluid supply and delivery conduits and the opposite ends of the piston valve, pressure fluid delivery control valve means operable between said cylinder and said piston valve intermediate said pressure fluid supply conduit and said piston valve pressure fluid conduit means for variable controlling the delivery of pressure fluid from said supply conduit to said piston valve conduit means incident to variable movements of the piston valve toward the pressure fluid supply conduit, piston sleeve valve means shiftably carried on said piston valve means and located intermediate said pressure fluid delivery conduit and said pressure fluid exhaust conduit for controlling the exhaust of the pressure fluid from said piston valve fluid conduit means, a fluid pressure chamber formed in said cylinder between the end thereof and said exhaust conduit and the adjacent end of the piston valve, in communication with said piston valve conduit means, spring means between the cylinder and the sleeve valve means for urging said piston sleeve valve means toward its seat within the cylinder to control fluid pressure communication between the fluid pressure chamber and the pressure fluid exhaust conduit, an auxiliary differential pressure control cylinder connected to said fluid pressure chamber, a piston operable within said auxiliary cylinder, a piston rod connected to said piston and extending toward said piston valve for actuating engagement with the end of said piston valve, said piston and rod having a pressure fluid delivery passage therethrough for establishing fluid communication between the auxiliary cylinder above the head of said piston and said fluid pressure chamber, resilient yieldable abutment means carried on said piston valve between said piston valve and said piston sleeve valve and movable with the piston valve tending to unseat said piston sleeve valve to establish fluid communication between said pressure chamber and said exhaust conduit upon movement of said auxiliary cylinder piston in a direction toward said piston valve, spring means between said piston valve and the piston sleeve valve for yieldably stressing the piston sleeve valve toward said pressure chamber incident to movement of the piston valve in a direction toward said pressure chamber, a pressure fluid seal interposed between the interior of the piston sleeve valve and the exterior of the piston valve for arresting pressure fluid leakage between the piston sleeve valve and piston valve upon movement of the piston valve toward said pressure chamber and movable to an inoperative position by relative movement of the piston valve to the sleeve valve in a direction away from the pressure chamber to establish fluid communication intermediate the opposite ends of the piston sleeve valve between the piston valve and the piston sleeve valve, said piston sleeve valve having a plurality of small fluid conduits formed therein, each in communication at one end with the space between the piston valve and piston sleeve valve with their opposite ends opening through the valve seat engaging portion in communication with the outlets of said plurality of small fluid conduits.

7. In a fluid pressure regulator device, a main cylinder having a bore therethrough, a first closure for one end thereof, an adjustable elongated support extending from said first closure axially into said one end of the bore, a second closure for the other end of the bore having an axial opening therethrough into said bore, a plurality of pressure regulator cylinders of predetermined diameters adapted to be removably secured to said second closure, each pressure regulator cylinder having an axial guide opening therein in communication with said bore through the second closure, a piston slidable in each of said pressure regulator cylinders, said pistons each having a tubular piston rod slidable in said guide opening, one of said tubular piston rods being adapted to extend into said bore, said piston rods having a pressure fluid conduit extending axially therethrough to establish pressure fluid communication between the bore and the pressure cylinders above the pistons, vent means formed in each of said pressure regulator cylinders below said pistons, a plug valve head carried on the inner end of said elongated support, a piston valve member axially slidable in one direction in said bore toward said first closure and in the opposite direction toward the second closure, said piston valve having a valve seat therein comprising valve receiving recess for receiving said plug valve therein upon predetermined movement of the piston valve toward said first closure, said piston valve having a reduced extension at its opposite end terminating in a laterally projecting stop shoulder and spring seat, a sleeve valve member surrounding said piston valve extension and freely reciprocatable thereon between the piston valve and the stop shoulder and formed with an annular valve head facing the second closure, spring means between said stop shoulder and said sleeve valve head for urging the sleeve valve toward said piston valve, a second spring means between said piston sleeve valve and said piston valve for urging said piston sleeve valve toward said stop shoulder, said second closure having a valve seat facing the piston sleeve valve head for cooperating pressure fluid sealing engagement therewith upon movement of the piston sleeve and piston valves toward said second closure, spring means in said bore between said sleeve valve and said main cylinder for urging said piston sleeve valve toward seating engagement with the second closure valve seat, a fluid pressure supply conduit formed in said main cylinder in communication with said bore between said first closure and the recessed valve receiving end of the piston valve, a pressure fluid delivery conduit formed in said main cylinder in communication with said bore between the piston valve and the piston sleeve valve, a pressure fluid exhaust conduit formed in said main cylinder in communication with said bore between said pressure fluid delivery conduit and said second closure valve seat adjacent said second closure valve seat, conduit means formed in the piston valve and said piston valve extension, establishing fluid communication at all times between the interior of the cylindrical plug valve recess in the piston valve, and the space between the reduced extension end of the piston valve and the piston sleeve valve, and between the stop shoulder end of the piston valve and said second end closure for establishing fluid communication at all times between the pressure fluid delivery conduit and the interior of the plug valve recess and the space between the second end closure above the valve seat therein at all times, a fluid seal surrounding said piston valve between said pressure supply and delivery conduits, and a fluid seal surrounding said piston valve between said pressure delivery conduit and said exhaust conduit.

8. An apparatus as claimed in claim 7 in which an annular fluid pressure seal surround the piston valve extension adjacent the end of the sleeve valve, between the interior of the sleeve and the exterior of the piston valve extension and arranged to be uncovered by movement of the sleeve valve toward the said stop shoulder to establish fluid communication between the space between the interior of the sleeve valve and the exterior of the extension, an annular channel surrounding the sleeve valve and formed in the valve seat portion thereof, and a pressure fluid supply conduit in the sleeve valve connected between said annular channel and the last mentioned space.

9. Apparatus as claimed in claim 7 in which said plug valve is slotted longitudinally at its outer end to provide a variable fluid delivery opening between pressure fluid supply conduit and the interior of the sleeve valve recess as the piston valve is shifted to cause the plug valve to progressively enter the valve recess in the piston valve.

10. Apparatus as claimed in claim 7 in which the plug valve fluid sealing means comprises an O ring seat formed in the periphery of said plug valve, a resilient O ring in said seat and a serrated back up washer interposed in the seat between one end of the seat for the O ring and the O ring, to permit fluid pressure to pass under the O ring from the plug valve recess upon complete disengagement of O ring from its sealing relation with the interior of the plug valve recess surface.

11. Apparatus as claimed in claim 7 in which the seal between the piston sleeve valve and the piston valve extension includes an O ring, an annular recess formed in and surrounding the piston valve extension for receiving the O ring therein, and a serrated spacing washer between the O ring and the side wall of the recess for allowing fluid pressure to pass under the O ring before the said O ring is completely uncovered by the relative movement of the sleeve valve on the extension toward the second closure.

12. In a differential pressure control valve device, a casing having a main pressure cylinder therein closed at its ends, having a pressure fluid supply conduit in communication with the cylinder adjacent one end, a pressure fluid exhaust conduit in communication at the other end, and a differential pressure delivery conduit in communication adjacent said other end between the supply and exhaust conduits, an adjustable plug valve support extending into said one end of the cylinder, valve means fixed on the end of the support concentrically within the cylinder adjacent the supply conduit comprising a cylindrical plug valve head, an annular channel surrounding said support below said head, a resilient O ring seal positioned in said channel, a serrated flat metallic washer positioned in said channel between the head and the O ring, a piston valve reciprocatable within said cylinder having a cylindrical recess in one end for receiving said plug valve head and said O ring therein upon predetermined piston valve travel toward said pressure supply conduit, said piston valve having pressure fluid conduit means formed therein in communication at one end with the interior of said recess and at its opposite end with the space between the said other end of the cylinder and the other end of the piston valve and including a connected conduit through said piston valve in communication with said delivery conduit, a piston sleeve valve reciprocatable on the piston valve between said delivery and exhaust conduits having a valve head facing said other end of the cylinder, a cooperating valve seat in said cylinder for said piston sleeve valve head, located between said pressure delivery conduit and said exhaust conduit, spring means operable between the casing and said piston sleeve valve for urging said piston sleeve valve toward said cooperating seat, resilient abutment means on said piston valve for unseating engagement with the piston sleeve valve upon predetermined movement of the piston valve toward said supply conduit, fluid sealing means between said piston valve and the cylinder intermediate said supply and delivery conduits, fluid sealing means intermediate said piston valve and said piston sleeve valve, fluid sealing means between said piston sleeve valve and said cylinder, intermediate said delivery and exhaust conduits, pressure actuated means for moving said piston valve toward said pressure supply conduit comprising an auxiliary pressure cylinder removably carried by said casing, a piston therein, piston valve actuating means operable between said piston and said piston valve for moving the piston valve toward said fluid pressure supply conduit, and a pressure supply conduit means connected in communication with said main pressure chamber between the interior of the main pressure cylinder intermediate said plug valve recess in the piston valve and the space above piston in the auxiliary pressure cylinder, and a venting passage formed in said auxiliary cylinder below said piston therein.

13. Apparatus as claimed in claim 12 in which the auxiliary pressure cylinder has a predetermined diameter relative to the diameter of the main cylinder, for the effecting a predetermined pressure differential between the pressure supply and delivery conduits, whereby auxiliary cylinders of different diameters can be substituted for varying the pressure differential between said supply and delivery conduits.

14. Apparatus as claimed in claim 13, in which a second auxiliary pressure differential actuator is provided, including a second auxiliary pressure cylinder removably connected in concentric alignment on the first auxiliary pressure cylinder and said piston, a piston movable in said second auxiliary cylinder having a piston rod projecting therefrom into the first auxiliary cylinder for actuating engagement with the first auxiliary piston, a pressure fluid conduit formed through said second piston rod and piston in communication at one end with the first auxiliary pressure cylinder above the piston therein and with the second auxiliary pressure cylinder above the piston therein, said second auxiliary cylinder being vented below the piston therein, whereby the fluid delivery pressure in the main cylinder is in communication with both of the auxiliary cylinders above the pistons therein, in opposition to the presure on the piston valve in the main cylinder adjacent the pressure supply conduit.

15. Apparatus as claimed in claim 12 in which said auxiliary pressure actuated means comprises an auxiliary pressure cylinder removably disposed on the casing in concentric alignment with said piston valve, a piston in said auxiliary cylinder having a piston rod therefor projecting through the end of the main cylinder into actuating engagement with the end of the piston valve and formed with a fluid conduit through said piston rod and piston to establish pressure fluid communication between the interior of the main cylinder and the interior of the auxiliary cylinder above the piston, said auxiliary cylinder being vented below the piston therein.

16. A differential pressure control valve device, a main cylinder, a piston valve operable within the cylinder, a pressure supply conduit connected to said main cylinder at one end at one side of the piston valve, an exhaust conduit connected to the main cylinder at its opposite end, a differential pressure delivery conduit connected to the cylinder adjacent said opposite end between said pressure supply and exhaust conduits, a pressure chamber formed in said cylinder between said exhaust conduit and said opposite end, a valve seat formed in said cylinder intermediate said pressure chamber and said exhaust conduit, facing toward said delivery conduit, a piston sleeve valve reciprocatable on said piston valve within the cylinder between said valve seat and said delivery conduit for seating and unseating cooperation with said valve seat, said piston valve having a conduit means formed therein establishing fluid communication at said one end with said pressure supply conduit and at its other end with said pressure chamber, and a connected conduit in communication with the cylinder between said piston sleeve valve and said delivery conduit, adjustable valve and cooperating seat means between said piston valve and said one end of the cylinder intermediate said pressure supply and said conduit means, operable to regulate the passage of fluid to said conduit means incident to predetermined movement of said piston valve toward said one end of the cylinder, spring means between said piston sleeve valve and said cylinder for resiliently urging said piston sleeve valve toward said pressure chamber and toward seating engagement with said cooperating valve seat, spring means between said piston valve and said piston sleeve valve urging said piston sleeve valve toward said valve seat upon piston valve movement toward said pressure chamber, resilient abutment means between said piston valve and said piston sleeve valve for unseating said piston sleeve valve incident to predetermined piston valve movement toward said one end of the cylinder, and auxiliary pressure actuating means for moving said piston valve toward said one end of the cylinder comprising an auxiliary pressure cylinder, means removably mounting said cylinder on said other end of the main cylinder, a piston shiftable within said auxiliary cylinder, actuating means between said piston and said piston valve for shifting the piston valve toward said one end of the main cylinder, and pressure conduit means in communication between the auxiliary pressure cylinder at the other side of the said piston and the said main cylinder pressure chamber.

17. Apparatus as claimed in claim 16 in which said piston sleeve valve is formed with a plurality of fluid supply conduits leading from its valve face the interior of the piston sleeve valve intermediate its ends, a pressure seal interposed between the interior of the piston sleeve valve and the exterior of the piston valve intermediate said passages and said piston sleeve valve and remote from its valve face, movable by said piston valve to unsealing relation, incident to movement of the piston valve in said piston sleeve valve toward said one end of the main cylinder to admit delivery pressure to said valve seat to assist in unseating said piston sleeve valve to establish fluid communication between the said pressure chamber and said exhaust conduit.

18. Apparatus as claimed in claim 17 in which the said other end of the main cylinder is formed with an axially threaded opening therethrough, and said auxiliary pressure cylinder is formed with a threaded axially nipple receivable in said threaded opening, said nipple having an axial guide opening therethrough, said auxiliary cylinder having a removable centrally threaded closure at its other end, and forming an auxiliary pressure chamber, a piston reciprocatable within said auxiliary cylinder having a hollow piston rod extending therefrom through said guide opening adapted to project into said pressure chamber of the main cylinder for actuating engagement with the end of said piston valve and establish pressure communication between said main cylinder pressure chamber and said auxiliary cylinder pressure chamber, said auxiliary pressure chamber having a pressure venting conduit located between piston therein and the guide passage for relieving fluid pressure in the auxiliary chamber below the said piston.

19. Apparatus as claimed in claim 18 in which a second auxiliary pressure cylinder is provided, having a threaded axial nipple received in the threaded opening for the plug closure of the first auxiliary cylinder and formed with an axial guide opening therethrough, said second auxiliary pressure cylinder having a threaded opening in its opposite end, and an axial closure received in the last mentioned threaded opening to form a second auxiliary pressure chamber, a piston reciprocatable within said second auxiliary cylinder having a hollow piston rod projecting therefrom through the last mentioned guide opening adapted to extend into the first auxiliary cylinder pressure chamber for actuating engagement with the first auxiliary cylinder piston, for moving the same toward said piston valve, the passage through said last mentioned hollow piston rod being adapted to establishing fluid communication through the first mentioned auxiliary cylinder piston rod between the main cylinder pressure chamber and the second auxiliary cylinder pressure chamber above the piston therein.

References Cited in the file of this patent

UNITED STATES PATENTS

| Number | Name | Date |
|---|---|---|
| 2,496,577 | Cahill | Feb. 7, 1950 |
| 2,500,555 | Majneri | Mar. 14, 1950 |
| 2,656,846 | Anderson | Oct. 27, 1953 |